United States Patent [19]
Tyler

[11] 3,880,353
[45] Apr. 29, 1975

[54] HEATING SYSTEM AND SAFETY VALVE
[75] Inventor: Hugh J. Tyler, Santa Ana, Calif.
[73] Assignee: Robertshaw Controls Company, Richmond, Va.
[22] Filed: Nov. 1, 1973
[21] Appl. No.: 411,871

[52] U.S. Cl. ................ 236/9 R; 236/21 B; 236/99; 431/85
[51] Int. Cl. ............................................. F24f 5/00
[58] Field of Search ............ 236/9 R, 10, 21 B, 99, 236/48 R; 431/78, 80 X, 85, 83, 84; 219/302, 330

[56] References Cited
UNITED STATES PATENTS
2,245,773  6/1941  Grant .................................. 236/10
2,576,558  11/1951  Bede .............................. 219/302 X
2,787,130  4/1957  Kaufman ........................ 62/212 X
3,284,600  11/1966  Mertler ............................... 337/318
3,325,099  6/1967  Jackson et al. ..................... 236/21 B
3,682,188  8/1972  Randolph et al. ..................... 431/80

*Primary Examiner*—William E. Wayner
*Attorney, Agent, or Firm*—Anthony A. O'Brien

[57] ABSTRACT

A heating system employs a thermostat fuel control device and a safety fuel control device, such as a safety valve retained against a closing bias wherein a bulb contains an expandable fluid for releasing the safety valve, responding to an overheat condition of the heating system. The safety fuel control device can be employed as an addition to the normal recyclic cutoff.

10 Claims, 4 Drawing Figures

HEATING SYSTEM AND SAFETY VALVE

BACKGROUND OF THE INVENTION

1. Field of the Invention

The invention relates to heating systems and, in particular, to heating systems which are automatically cutoff when a hazardous temperature is sensed.

2. Description of the Prior Art

The prior art, as exemplified in U.S. Pat. Nos. 2,245,773, 2,289,287, 2,292,830, and 2,631,656, contains many heating systems employing recycle safety switch cutoffs in series with a fuel control valve. The switches are mounted in the bonnet of the heating system for sensing an overheat condition; however, such recyclic safety switches can become defective or be shunted allowing the heating system to reach a dangerous heated condition.

A number of fluid expansion responsive valves in the prior art, as exemplified by U.S. Pat. Nos. 2,055,133, 2,627,911, 2,787,130, and 3,386,065, have been employed in many applications other than as safety cutoffs in a heating system; such valves having a number of deficiencies rendering them incapable of performing safety cutoff functions.

The prior art, as exemplified by U.S. Pat. No. 3,284,600, contains several liquid and gas charged switch devices charged at a partial vacuum to allow external atmospheric pressure to deflect a diaphragm to close a switch such that when the internal vapor or gas pressure equals atmospheric pressure, either due to a leak or an increase in temperature, the diaphragm is allowed to move to open the switch; such switch devices, when temperature operated, reclosing upon the temperature returning again to below the switch operating temperature.

Also, the prior art, as exemplified in U.S. Pat. Nos. 1,744,735, 3,258,363, 3,441,819, 3,516,791, and the publication (USSR Academy of Sciences, M. M. Dubinin, "Thermal Treatment and Microporous Structure of Carbonaceous Adsorbents," *Proceedings of the Fifth Conference on Carbon*, Vol. 1, 1962, pages 81–87) contains many adsorbent carbon materials including decomposed polyvinylidene chloride and polyvinylidene flouride. Adsorbent carbon materials are widely used in removing contaminants, or the like, from gases or liquids. Polyvinylidene chloride and polyvinylidene flouride, in particular, have been recognized for their molecular sieve property; that is, their ability to adsorb certain gaseous materials which have small molecular sizes while being incapable of adsorbing other gaseous materials which have larger molecular sizes.

U.S. Pat. Nos. 3,318,358, 3,495,925, and 3,726,630 disclose prior art electrical ignition circuits which can be employed in heating systems.

SUMMARY OF THE INVENTION

The invention is summarized in that a heating system includes a burner; means for supplying fuel from a source to the burner; thermostat means for controlling the fuel supplying means; and safety means for interrupting the fuel supplying means, said safetly means including bulb means containing an expandable fluid positioned to sense an overheat condition of the heating system to operate the safety means.

An object of the invention is to construct a heating system with an improved fuel interrupting means which is not subject to an electrical failure, such as power failure, shorts, open circuits, and the like.

Another object is to provide a fluid expansion safety control which remains operated unitl it is manually reset.

It is also a object of the invention to design a heating system which has a higher temperature safety control in addition to the normal safety control.

Still another object of the invention is to provide a fluid expansison safety valve which is fail-safe to leaks; fail-safe meaning that the valve is operated in response to either an overheat condition or a leak in the enclosed fluid expansion system.

Additional features of the invention include the provision of a gas adsorbent material in a temperature sensing bulb; and the provision of a fluid expansion valve with latching facilities for latching the valve against a closing bias.

Other objects, features and advantages of the invention will be apparent from the following description taken in conjunction with the accompanying drawings.

DESCRIPTION OF THE PREFERRED EMBODIMENT

Figure 1:
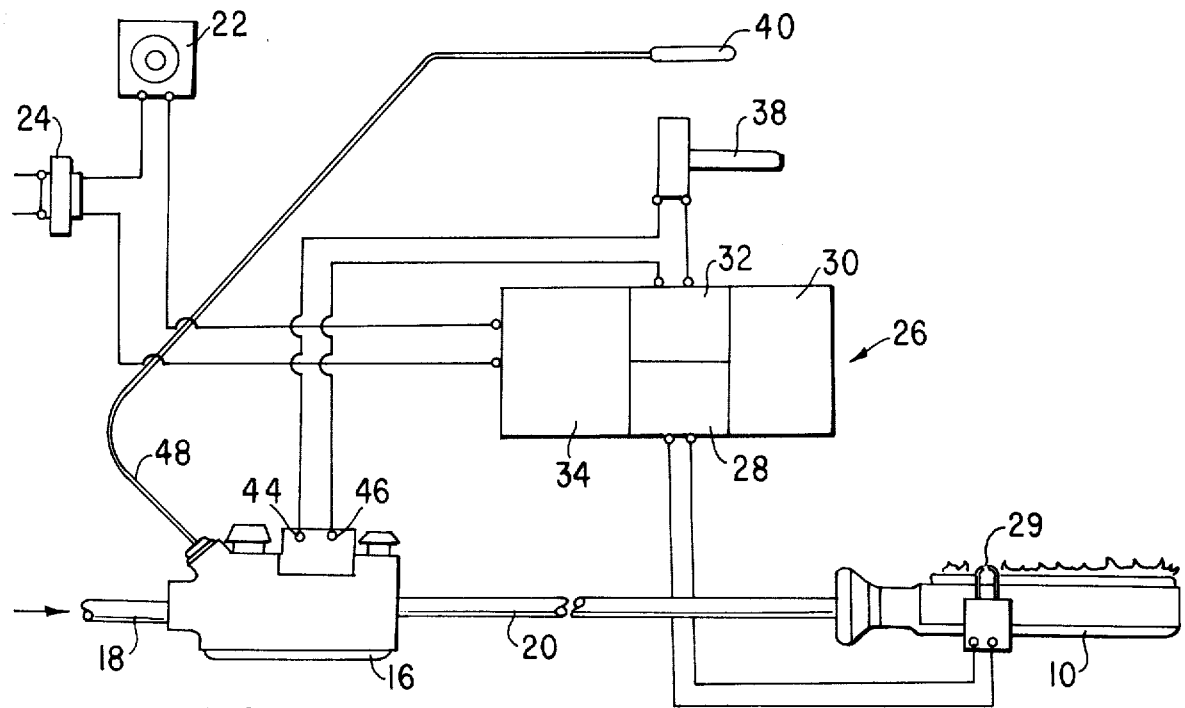
FIG. 1 is a diagram of a heating system in accordance with the invention.

As illustrated in FIG. 1, the invention is embodied in a heating system including a burner 10 which, through a suitable heat exchanger (not shown), heats a heating medium, such as forced air. A fuel control device 16 connected by a conduit 18 is a source of fuel, such as gaseous fuel, supplies fuel to a conduit 20 connected to the burner 10. A thermostat 22, such as a space thermostat includes switch means connected in series with the secondary winding of a transformer 24 which has its primary connected to a suitable voltage source. The thermostat 22 and the secondary of the transformer 24 are connected to inputs of an electrical ignition circuit indicated generally at 26. The electrical ignition circuit 26 includes an igniter driving circuit portion 28, such as a spark voltage generator connected to spark electrodes 29, a flame or ignition sensing circuit portion 30, a timing switch circuit portion 32 which is disabled when the ignition sensing circuit portion 30 senses ignition, and an input portion 34 connected to the thermostat 22 and transformer 24. Since many suitable electrical ignition circuits are known or described in the prior art, the circuit 26 is not described in detail.

A recyclic thermal operated limit switch 38 and a fluid expansion temperature sensing bulb 40 are mounted in positions to sense overheated conditions, for example in or on the bonnet (not shown) of the heating system. The switch 38 is connected in series with electrical leads from the timing switch portion 32 of the ignition circuit 26 to the control terminals 44 and 46 of the fuel control device 16. The temperature sensing bulb 40 is connected to the fuel control device 16 through the capillary or tube 48. The limit switch 38 is selected to operate at a first overheat temperature while the temperature sensing bulb 40 is designed to operate the control device at a second overheat temperature higher than the first overheat temperature.

Figure 2:
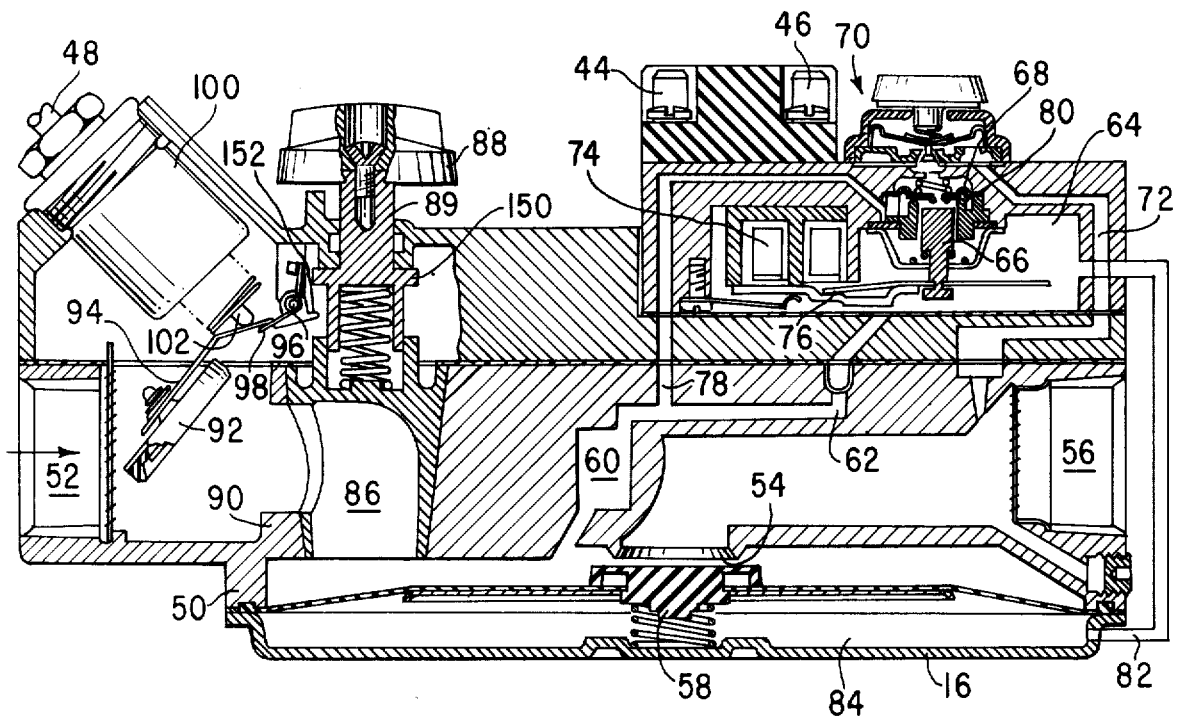
FIG. 2 is a cross section of a fuel control device in the system of FIG. 1.

Referring to FIG. 2, the fuel control device 16 includes a housing 50 with an inlet 52 connected to the conduit 18 (FIG. 1), a main valve seat 54, and an outlet 56 connected to the conduit 20 wherein the valve seat 54 is between the inlet 52 and outlet 56. A diaphragm valve 58 is disposed in operative relationship relative to the valve seat 54. A bleed flow passageway 60 communicates with the inlet 52 and through a restricted passageway 62 into a bleed chamber 64. Openings or slots surrounding an upwardly spring biased valve operator 66 communicate from the bleed chamber 64 through a central opening in a downwardly spring biased, doubleacting diaphragm valve 68 to a pressure regulator, indicated generally at 70, which communicates through conduit 72 back to the outlet 56. A solenoid 74 connected to the terminals 44 and 46 has a pivotal armature 76 which is pivotally joined to the valve operator 66. An unrestricted passageway 78 from the bleed passageway 60 communicates between a valve seat 80 and a bottom of the double acting diaphragm valve 68 into the bleed chamber 64. A conduit 82 communicates from the bleed chamber 64 into a diaphragm valve operating chamber 84 below the diaphragm valve 58.

A gas cock valve 86 is positioned between the valve seat 54 and the inlet 52. A rotatable knob 88 has an upwardly spring biased stem 89 with splines or the like, slidably joining the stem to the cock valve 86. A valve seat 90 is positioned between the cock valve 86 and the inlet 52. A valve 92 is mounted on the end of a lever 94 which has its other end pivoted at point 96 on the housing 50. A spring 98 normally biases the lever 94 to maintain the valve 92 open from the valve seat 90.

Figure 3:
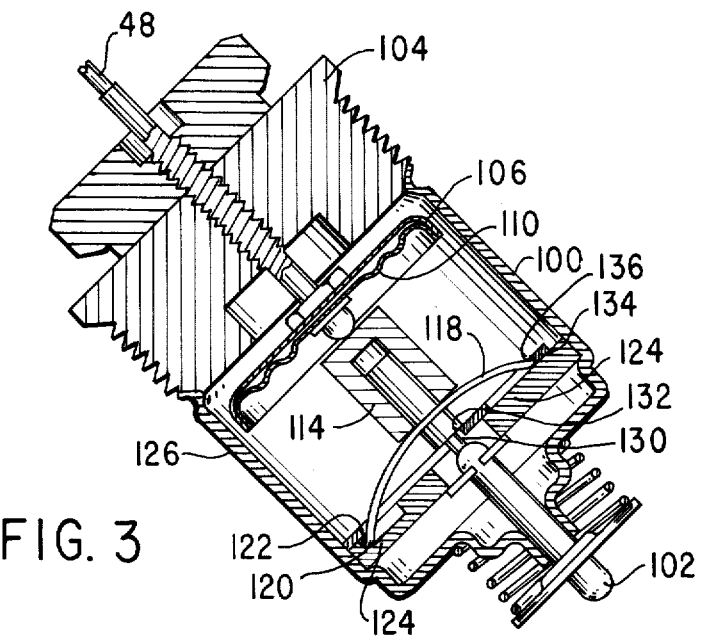
FIG. 3 is a cross section of a fluid volume expansive actuator for controlling a fuel valve in the control device of FIG. 2 in an unactuated position.
Figure 4:
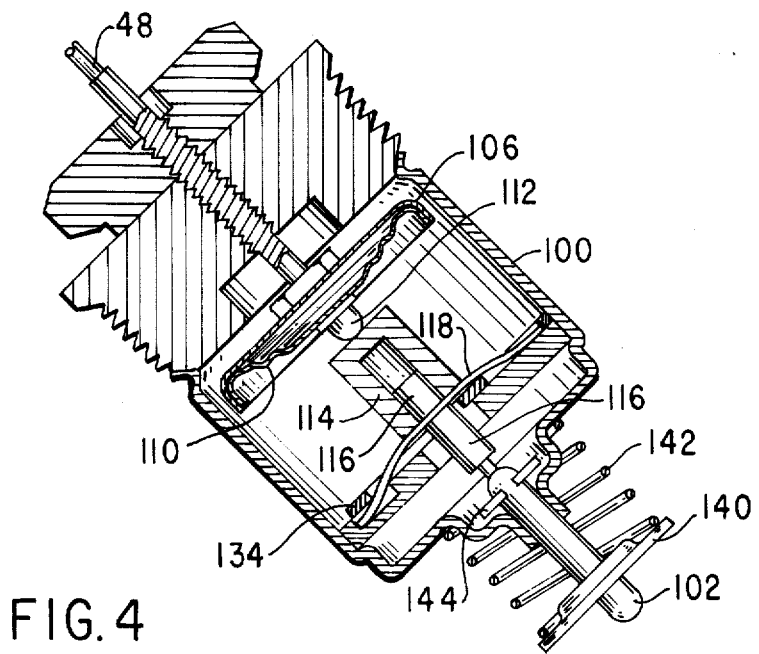
FIG. 4 is a view similar to FIG. 3 but illustrating the actuator device in an actuated position.

The capillary tube 48 communicates with a valve actuator 100 secured in the housing 50. The actuator 100 has a plunger 102 engaging the lever 94. Referring to FIGS. 3 and 4, the valve actuator 100 has a threaded support member 104 which supports the end of the tube 48. An expansion device 106 is secured to and communicates with the end of the tube 48 and has a movable wall or diaphragm 110 which is formed from a suitable elastic material biased toward an outwardly bowed position, as shown in FIG. 4, such that with an internal pressure about equal to atmospheric pressure, the diaphragm 110 assumes the outwardly bowed position. An abutment member 112 centrally mounted on the diaphragm 110 engages a tubular member 114 which is slidable over an upper end 116 of the plunger 102. The lower end of the tubular member 114 engages a bowed spring 118 which is secured at one end 120 in a recess 122 of a supporting plate 124. The supporting plate 124 is mounted within a housing portion 126 attached to the threaded support member 104. The plunger 102 has a notch 130 forming an abutment 132 which is engageable by a sliding plate 134. The other end of the bowed spring 118 is secured to the sliding plate 134 at a recess 136. The bowed spring 118 is selected to apply an upward force to the tubular member 114 which is less than the force produced by the elasticity of the movable diaphragm 110. The lower end of the plunger 102 has a flange 140 secured thereto with a compression spring 142 interposed between the flange 140 and the end of the housing 126. The upper end of the lower portion of the plunger 102 has a C-ring 144 secured thereto for engaging the bottom of the plate 124 to limit upward movement of the plunger 102.

Referring back to FIG. 2, the stem 89 from the knob 88 has a flange 150 for normally engaging an upper bearing portion in the housing 50. The flange 150 extends over an extending portion 152 at one end of the lever 94 for pivoting the lever 94 about the pivot 96 to reset the actuator 100.

The bulb 40, the tube 48 and the device 106 contain an expandable fluid, such as a gas or a liquid which generates a gas or vapor pressure equal to atmospheric pressure at the second overheat temperature. The charge of fluid in the bulb 40, the tube 48 and the bellows 106 is selected to have, at normal temperatures less than the second overheat temperature, a pressure which is sufficiently less than atmospheric pressure to allow atmospheric pressure to force the wall 110 to the retracted position of FIG. 3.

In manufacture of a fail-safe liquid filled actuator a vacuum is drawn in the bulb 40, the tube 48 and the device 106, which are then filled with the selected liquid. The bulb 40 is placed in a temperature medium at slightly below the second overheat temperature. The abutment number 112 and diaphram 110 are clamped to their internal stop or the position shown in FIG. 3 and the bulb 40, tube 48 and device 106 are sealed. The device 106 is then assembled to the actuator 100. The operating temperature of the actuator can be lowered to a lower temperature by crimping the bulb 40.

In a gas filled actuator, the bulb 40 contains an adsorbent material, such as anay of the activated adsorbent materials or a porous decomposed carbonaceous material formed from a compound of carbon and a non-carbon component by removing the non-carbon component leaving cavities of sufficient size to adsorb substantial quantities of the gas. The bulb 40, tube 48 and device 106 contain a charge or quantity of gas, such as a noble gas selected from helium, neon, argon, krypton or xenon. Other gases which are non-reactive at the temperature of use can be employed so long as the gases have a molecular size which is readily adsorbed by the adsorbent material. The particular gas used is selected by considering the cost and the desired pressure or volume change per degree temperature change, which pressure or volume change increases directly with the molecular weight of the gas; for example, xenon produces a greater pressure or volume change per degree temperature change than krypton.

One acceptable decomposed compound is formed from a synthetic polymer having volatile components such as hydrogen and a halogen, which can be driven off by heat leaving a carbonaceous skeletal structure which is porous. Suitable synthetic polymers are polyvinylidene chloride or polyvinylidene fluoride; the former available in copolymer form, SARAN 113, from DOW Chemical Company. Granules of polyvinylidene chloride or polyvinylidene fluoride are formed into adsorbent carbonaceous granules by carbonizing or pyrolytic decomposition in a purifying atmosphere, such as a vacuum or a purging flow of inert gas. Carbonizing is performed by heating to temperature less than the melting point but greater than the temperature at which decomposition can be initially observed. For polyvinlyidene chloride, carbonizing is performed at a temperature in the range from 138°c (280°F) to 177°c (350°). The duration of heating required for complete carbonization of the synthetic polymer is dependent upon the size of the granules of the synthetic polymer and the temperature employed. Along with utilizing a predetermined temperature and duration for a certain size of granular synthetic polymer, observation of a reduction in gas being removed by a vacuum system or the gas being evolved from the granular material are other methods of determining complete carbonization. During carbonization, the non-carbon components, that is hydrogen and the halogen, are volatilized and removed from the synthetic polymer structure leaving a carbon skeletal structure which is highly porous. After the synthetic polymer is carbonized, the carbonized polymer can be subjected to a higher temperature up to about 1,510°C (2750°) to outgas hydrogen and halogen gases which may have been adsorbed. Outgassing can be completed in a short duration, for example 15 minutes.

In manufacture of a gas filled actuator the adsorbent material is placed within the bulb 40. The bulb 40, the tube 48, the device 106, and the support member 104 are assembled together with the rest of the actuator 100. The bulb 40 is evacuated and heated to outgas air adsorbed by the adsorbent material. The temperature of the bulb is then adjusted to the second overheat temperature and a charge of gas is supplied to the bulb 40 until the actuator is operated by the movement of the sliding plate 134 disengaging the abutment 132. At this point the open end of the bulb 40 is sealed and the actuator is completed.

In operation of the heating system shown in FIG. 1, a demand for heat initiated by the closing of the switch means in the thermostat 22 activates the igniter circuit 26 which initiates a timing period for the timing switch circuit portion 32. During the timing period a circuit through the recyclic limit switch 38 to the terminals 44 and 46 of the fuel control device 16 is energized to operate fuel control device 16 supplying gas to conduit 20 and to the burner 10. Simultaneously, the igniter driving circuit portion 28 of the igniter circuit 26 applies a spark generating voltage to the spark electrodes 29 adjacent the burner 10 to ignite the fuel. The ignition sensing circuit portion 30 of the igniter circuit 26 senses the presence of ignition or flame and prevents the timing function of the timing switch portion 32 from terminating the energization of the circuit to the terminals 44 and 46 of the control device 16. Should the sensing portion 30 fail to sense ignition or flame within the timing period of the timing switch portion 30, the switch portion 30 will terminate the energization of the circuit to terminals 44 and 46 preventing further flow of fuel to the burner 10.

In the event, an overheat condition reaches the first overheat temperature the recyclic limit switch 38 opens terminating the energization of terminals 44 and 46 to terminate the flow of fuel to the burner 10. In the event of failure of the switch 38 or the control device 16 to terminate flow by deenergizing terminals 44 and 46, the fluid in the bulb 40 expands in response to increase of temperature to the second overheat temperature to operate the fuel control device 16 to terminate the flow of fuel to the burner 10. Additionally, a leak in the bulb 40 or tube 48 results in the control device 16 terminating the flow of fuel.

When the switch means of the thermostat 22 closes indicating a demand for heat, the energization of terminals 44 and 46 of the fuel control device 16 energizes the solenoid 74, FIG. 2, pivoting the armature 76 to lower the valve operator 66 against its upward spring bias. The double acting diaphragm valve 68 moves downward engaging the valve seat 80 to terminate gas flow through the unrestricted line 78 from the bleed flow line 60 into the bleed flow chamber 64. The central opening through the valve member 68 is opened by downward movement of the valve operator 66 allowing the passage of gas from the bleed flow chamber 64, through the regulator valve 70 to the conduit 72 and the outlet 56 reducing the pressure in the chamber 64 to a set regulated pressure. Gas through the restricted passageway 62 maintains the regulated pressure in the chamber 64.

When the pressure in the chamber 64 is reduced the pressure in chamber 84 is also reduced allowing the valve 58 to open. Gas passes from the inlet 52 through valve seat 90, the open cock valve 86 and the valve seat 54 to the outlet 56. Since the opening between the diaphragm valve 58 and the valve seat 54 is controlled by gas pressure within the chambers 84 and 64 which is controlled by the regulator 70 in response to pressure in the conduit 72 and outlet 56, the outlet pressure is regulated.

When the switch means in the thermostat 22 deenergizes the electric ignition circuit or the limit switch 38 opens in response to the first overheat temperature, the solenoid 74 is deenergized allowing the operator 66 to be moved by its spring bias upward into engagement with the diaphragm valve 68. The engagement of the operator 66 with the diaphragm valve 68 closes the central opening in the diaphragm valve 68 terminating outward flow of gas from the bleed chamber 64 through the regulator valve 70. The operator 66 lifts the diaphragm valve 68 against its spring bias from the valve seat 80 allowing gas from the unrestricted passageway 78 to flow into the chamber 64. The resulting increase in pressure in the chamber 64 is applied through conduit 72 to the main diaphragm operating chamber 84 causing the main diaphragm valve 58 to engage the valve seat 54 and terminate the flow of fuel from the inlet 52 to the outlet 56.

Referring to FIGS. 3 and 4, if the temperature in the bulb 40 (FIG. 1) should increase to the second overheat temperature, the fluid in the bulb expands increasing the pressure in the bulb 40, tube 48 and expansion device 106 to atmospheric pressure to allow the elasticity of the diaphragm 110 to force the tubular member 114 downward flattening the bow spring 118 to slide the slide plate 134 to the right, as shown in FIG. 4. Disengaging the slide plate 134 from the abutment 132 by movement of the slide plate 134 allows the plunger 102 to be moved downward under the force to the spring 142. The downward movement of the plunger 102 pivots the arm 94 (FIG. 2) causing the valve 92 to engage the valve seat 90 terminating the flow of gas through the fuel control device 16. In a similar manner, a leak in the bulb 40, tube 48 or device 106 will allow air to enter increasing the pressure in the device 106 to atmospheric pressure and operating the actuator 100 to terminate the flow of gas through the fuel control device 16.

The cock valve 86 can be rotated to an off position by the knob 88 while repairs are made to the heating system.

In order to reset the safety valve actuator 100 after the valve 92 has been closed and the cause of the over-heating corrected, the knob 88 and stem 89 are pushed downward engaging the flange 150 against the extension 152 on the lever 94 forcing the lever 94 to pivot upward against the plunger 102 moving the plunger 102 back into the housing 126 until the bowed spring 118 forces the sliding plate 134 back into the notch 130.

It is particularly advantageous that the heating system employs two diverse types of safety controls, namely electrical and fluid expansion. Failure of one type, such as by an electric short, crimped tube, or the like, will not ordinarily cause failure of the other type. The present fluid expansion safety device does not use energy whereas electric safety devices usually require a constant current or electrical power. The 3-foot maximum electrical lead length presently existing for thermoelectric limit devices does not apply; capillary length is not so limited. The design of the present fluid expansion safety valve allows it to be used in place of many electro-magnetic safety valves.

One advantage of using a gas charge with an adsorbent material in the bulb 40 is that the temperature of actuation or operation can be set at any temperature within a wide range of temperature, whereas a liquid charge in the bulb is limited to the particular boiling point of the liquid. Of the adsorbent materials, a decomposed unactivated synthetic polymer, such as carbonized polyvinylidene chloride or carbonized polyvinylidene fluoride, produces a greater volume or pressure change per degree of temperature change than activated materials, such as activated charcoal. The greater volume or pressure change per degree of temperature change insures that a gas expansion operated safety control has sufficient ability to do work to respond reliably to the overheat temperature of operation, particularly when used in conjunction with a heavier gas, such as krypton and xenon.

Since many variations, changes in detail and modifications may be made to the present embodiment, it is intended that all matter disclosed in the foregoing description or shown in the drawings be interpreted as illustrative and not in a limiting sense.

What is claimed is:

1. A heating system comprising a burner;
means for supplying fuel from a source to the burner;
thermostat means for controlling the fuel supplying means;
a safety valve for interrupting the fuel supplying means;
solely mechanical means including bulb means containing an expandable fluid positioned for sensing an overheat condition of the heating system and for operating the safety valve,
means for maintaining the mechanical means in an operated position, and
manual means for resetting the mechanical means to an unoperated condition.

2. A heating system as claimed in claim 1 wherein the bulb means is charged to a pressure which is less than atmospheric pressure and is operated by pressure equal to atmospheric pressure.

3. A heating system as claimed in claim 2 including a spring means,
a latch for holding the spring means in a stored energy condition, and
means responsive to a predetermined expansion of the fluid for releasing the latch to allow the spring means to operate the safety valve.

4. A heating system as claimed in claim 1 wherein the burner is a gaseous fuel burner,
the supplying means includes a second valve for controlling the flow of gaseous fuel to the burner, and
the thermostat means controls the second valve.

5. A heating system as claimed in claim 1 wherein the bulb means contains
a gas adsorbent material, and
a charge of gas.

6. A heating system as claimed in claim 5 wherein
the gas adsorbent material includes a carbonized polymer selected from carbonized polyvinylidene chloride and carbonized polyvinylidene fluoride, and
the gas is selected from krypton and xenon.

7. A heating system comprising
a burner,
means for supplying fuel from a source to the burner,
thermostat means for controlling the fuel supplying means,
recyclic means for interrupting the fuel supplying means when an overheat condition exceeds a first predetermined temperature,
a safety valve for interrupting the fuel supplying means,
solely mechanical means including bulb means containing an expandable fluid positioned for sensing an overheat condition of the heating system and for operating the safety valve,
means for maintaining the mechanical means operated when an overheat condition exceeds a second predetermined temperature, and
manual means for resetting the mechanical means to an unoperated condition.

8. A heating system as claimed in claim 7. wherein the burner is a gaseous fuel burner;
the supplying means includes an electrically operated valve and a fluid expansion operated valve for controlling the flow of gaseous fuel to the burner,
the thermostat means includes a first temperature responsive switch controlling the enertization of the electrical valve,
the recylic means includes a second temperature responsive switch controlling the energization of the electrical valve and positioned to sense a first overheat temperature of the heating system,
The safety means includes bulb means containing an expandable fluid positioned to sense a second overheat temperature greater than the first overheat temperature for controlling the fluid expansion operated valve.

9. A heating system comprising
a gaseous fuel burner;
means including a first valve having an electrical actuator and a second valve having a fluid expansion actuator for supplying fuel from a gaseous fuel source to the burner;
an electrical ignition circuit including timing switch means in an energizing circuit connected to the electrical actuator for energizing the electrical actuator for a predetermined duration upon energization of the ignition circuit and ignition sensing means for maintaining the energizing circuit in operation during the presence of a flame from the burner, a thermostat switch controlling the energization of the electrical ignition circuit and energizing circuit, a safety switch connected in series with the energizing circuit and positioned to sense an overheat condition, said safety switch opening at a first overheat temperature;

a bulb positioned to sense an overheat condition and connected to the fluid expansion actuator;

said fluid expansion actuator having spring means for urging the second valve closed, a latch for holding the spring means in a retracted position, and fluid expansion means for releasing the latch;

said bulb and fluid expansion means being charged with an expandable fluid at less than atmospheric pressure; and said fluid expansion means being operable by a pressure in the bulb equal to atmospheric pressure.

10. A heating system as claimed in claim 9, wherein the bulb contains a gas adsorbent material and the bulb and fluid expansion means are charged with a gas which can be adsorbed by the adsorbent material.

* * * * *